United States Patent
Lee et al.

(10) Patent No.: US 7,796,891 B2
(45) Date of Patent: Sep. 14, 2010

(54) ROF LINK SYSTEM FOR SUPPORTING VARIOUS SERVICES

(75) Inventors: Han-Lim Lee, Seoul (KR); Seong-Taek Hwang, Pyeongtaek-si (KR); Byung-Jik Kim, Seongnam-si (KR); Gyu-Woong Lee, Suwon-si (KR); Hoon Kim, Suwon-si (KR); Jae-Hoon Lee, Seoul (KR); Yong-Gyoo Kim, Seoul (KR); Sang-Ho Kim, Seoul (KR); Sung-Kee Kim, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 835 days.

(21) Appl. No.: 11/633,838

(22) Filed: Dec. 5, 2006

(65) Prior Publication Data
US 2007/0147273 A1    Jun. 28, 2007

(30) Foreign Application Priority Data
Dec. 22, 2005    (KR) .................... 10-2005-0127761

(51) Int. Cl.
*H04B 10/00*    (2006.01)
(52) U.S. Cl. ...................................... 398/115
(58) Field of Classification Search ................ 398/115, 398/116, 117; 455/553.1, 561, 562.1
See application file for complete search history.

(56) References Cited

U.S. PATENT DOCUMENTS

2002/0016183 A1* 2/2002 Lehtinen .................. 455/553

* cited by examiner

*Primary Examiner*—Quan-Zhen Wang
(74) *Attorney, Agent, or Firm*—Cha & Reiter, LLC

(57) ABSTRACT

Disclosed is a radio-over-fiber (ROF) system for supporting various services, the system comprising: a central access platform (CAP) for providing time division duplexing (TDD), frequency division duplexing (FDD), and broadcasting services, converting a TDD downward signal and FDD/broadcasting downward signals into optical signals, respectively, transmitting the converted optical signals to a remote access unit (RAU), converting a TDD upward signal and an FDD upward signal, which have been transmitted as optical signals from the RAU, into electric signals, respectively, and using an optical circulator in order to separate upward and downward signals from each other; and the RAU for converting the TDD downward signal and FDD/broadcasting downward signals transmitted from the CAP into electric signals, respectively, converting the TDD upward signal and FDD upward signal to be transmitted to the CAP into optical signals, respectively, and using an optical circulator in order to separate upward and downward signals from each other, wherein the RAU includes a plurality of signal filtering/separating/combining units, which wirelessly emit the TDD downward signal and FDD/broadcasting downward signals, having been converted into electric signals, through an antenna, and which separate wirelessly-received TDD upward signal and FDD upward signal from each other.

9 Claims, 9 Drawing Sheets

ROF LINK SYSTEM FOR SUPPORTING VARIOUS SERVICES

CLAIM OF PRIORITY

This application claims the benefit of the earlier filing date, pursuant to 35 U.S.C. 119(a), to that patent application entitled "ROF Link System For Supporting Various Services" filed in the Korean Intellectual Property Office on Dec. 22, 2005 and assigned Serial No. 2005-127761, the entire contents of which are incorporated herein by reference.

BACKGROUND OF THE INVENTION

1. Field of the Invention

The present invention relates to a radio-over-fiber link system for supporting various services.

2. Description of the Related Art

With the diversification and rapid increase of information and communication services, it becomes necessary to provide very high speed wireless multimedia communication service through combination of the optical communication technology and the wireless communication technology. Accordingly, interest is being focused on a technology of applying a microwave to a very high-speed optical communication network, by combining a wired communication technology with a wireless communication technology so as to enable various large-capacity multimedia information and communication services. Particularly, research is being actively conducted on a synthetic technology including two types of incorporated technologies, that is, on a radio-over-fiber (ROF) technology, which simultaneously uses an optical communication technology for high-speed transmission and a wireless technology for mobility.

Such an ROF technology basically uses an optical link apparatus and a radio link apparatus as basic components. The optical link apparatus modulates a transmission signal into a microwave-band signal, converts the microwave-band signal into an optical signal, and then transmits the optical signal through an optical fiber. The wireless link apparatus wirelessly carries a signal which has been received through the optical fiber. With respect to the ROF technology, researches are being actively conducted to develop a system capable of efficiently providing various wireless services for voice, broadcasting, data, etc., by tacking into consideration the demand for a broadband and the characteristics of the optical and wireless communications. In an environment in which various wireless services for voice, broadcasting, data, etc., are provided, it is inefficient to construct a remote antenna link every type of service. For this reason, the ROF link technology enables sharing of various types of service systems; so as to allow simultaneous transmission of multiple wireless services through one link; thereby improving the transmission efficiency.

Wireless communication systems use a frequency division duplexing (FDD) scheme which uses different frequencies in order to discriminate between uplink and downlink, and a time division duplexing (TDD) scheme which uses different transmission times in order to discriminate between uplink and downlink. An in-building solution or a common base station for wireless communication systems, which use different duplexing schemes (i.e., TDD and FDD schemes), requires an RF front-end device having a new structure.

An RF front-end device, which simultaneously supports TDD and FDD systems, can reduce the size of a base station or in-building system and can reduce the cost for system construction by sharing an amplifier and/or an antenna, when the TDD and FDD systems are used together in the base station or in-building system. In order to transmit a wireless signal to the RF front-end device as described above, the ROF technology is used.

FIG. 1 is a block diagram illustrating the construction of a central station (CS) 11 and a remote access unit (RAU) 12 in a conventional ROF link system for supporting various services, in which an ROF link structure including a front-end device capable of simultaneously supporting TDD and FDD systems is shown. Since the TDD system discriminates between uplink and downlink based on time bands and the FDD system discriminates between uplink and downlink based on frequency bands, it is difficult to separate a signal, to which TDD and FDD signals have been multiplexed, into uplink and downlink signals by using a switch or a filter. Therefore, FIG. 1 shows a case of employing a circulator in order to discriminate between uplink and downlink signals.

The CS 11 includes an electric-optical converter 111 and an optical-electric converter 112. The electric-optical converter 111 converts a downward signal, to which TDD and FDD signals have been multiplexed, into an optical signal, and transmits the optical signal to the RAU 12. The optical-electric converter 112 converts an upward optical signal, which has been transmitted through an upward optical fiber 14 from the RAU 12, into an electric signal (i.e., an RF signal). The RAU 12 includes an optical-electric converter 121, a downward high-power amplifier (HPA) 122, a circulator 123, an upward low-noise amplifier (LNA) 125, and an electric-optical converter 126. The optical-electric converter 121 converts a downward optical signal transmitted from the CS 11 into an electric signal, and the downward high-power amplifier 122 amplifies a downward signal output from the optical-electric converter 121. The circulator 123 allows a signal amplified by the downward high-power amplifier 122 to be emitted through an antenna, and establishes a signal path to provide a signal received through the antenna to the upward low-noise amplifier 125. The upward low-noise amplifier 125 amplifies a signal provided from the circulator 123, and the electric-optical converter 126 converts a signal output from the upward low-noise amplifier 125 into an optical signal and transmits the converted optical signal through the upward optical fiber 14 to the CS 11.

In FIG. 1, the circulator 123 outputs a downlink input signal, which has been received through a first port thereof, to a second port thereof, and outputs an uplink signal, which has been received through the second port thereof, to a third port thereof, thereby separating received signals into a downlink signal and an uplink signal. However, when an electric circulator is used as the circulator 123, a part of a downlink signal received through the first port thereof may be output to the third port thereof because the electric circulator has a low isolation. Also, when impedance matching is not completely achieved between the circulator and the antenna, a part of a downlink signal may reflect from the antenna, and be input to the second port of the circulator, thus the downlink signal may be output through the third port thereof. Generally, since large signal loss occurs in the air environment, the intensity of an uplink signal input through the antenna is very low. Therefore, the downlink signal output through the third port of the circulator has a relatively higher intensity than that of a received uplink signal, thereby saturating the amplifier for uplink, so that a downlink performance may deteriorate.

It is possible to reduce the intensity of an FDD downlink signal flowing into an uplink path by using a band stop filter. However, even in this case, it is impossible to reduce the intensity of a TDD downlink signal flowing into the uplink path, so that such a problem exerts a negative effect upon both uplinks of TDD and FDD systems.

Also, in the case of downlink in FIG. 1, TDD and FDD downlink signals are converted into optical signals by the electric-optical converter of the CS and are then transmitted through an optical fiber. The transmitted optical signals are converted into RF signals by the optical-electric converter of the RAU, and are output into the air via the amplifier, the circulator, and the antenna. In the case of uplink, an upward signal input into the antenna of the RAU passes through the circulator and the uplink amplifier, is converted into an optical signal by the electric-optical converter, and is then transmitted through the optical fiber. The transmitted signal is converted into an RF signal by the optical-electric converter of the CS. In such an ROF link, a non-linear phenomenon of the electric-optical converter exerts a large influence upon the entire system. A downlink signal flowing into an uplink path in an RF front-end device using a circulator may saturate the low-noise amplifier and/or the electric-optical converter or may cause operation of these devices with a lower current than an operational threshold current, thereby considerably deteriorating the uplink performance.

FIG. 2 is a block diagram illustrating the construction of a central station (CS) and a remote access unit (RAU) in another conventional ROF link system for supporting various services. According to the construction shown in FIG. 2, a CS 21 transmits upward/downward control information about upward/downward TDD signals to an RAU 22, and a switch 223 of the RAU 22 separates the upward/downward TDD signals from each other based on the control information, in order to prevent a TDD downward signal from exerting an influence upon an upward signal. In detail, the CS 21 of FIG. 2 has a construction similar to that of the CS 11 shown in FIG. 1, except that the electric-optical converter 211 also multiplexes a control signal for transmission of upward/downward control information about TDD signals together with TDD and FDD signals, and transmits the multiplexed signal through a downward optical fiber 23 to the RAU 22. The RAU 22 includes a demultiplexer 224, which separates the control signal from a downward signal received through an optical-electric converter 221, and provides the separated control signal to a controller 229. Also, the downward signal passes through the demultiplexer 224 and a downward amplifier 222, and is then input to a first duplexer 225. The first duplexer 225 separates the downward signal into a TDD downward signal and an FDD downward signal, and then provides the TDD downward signal to the switch 223 and provides the FDD downward signal to a triplexer 228. The triplexer 228 outputs the TDD downward signal provided through the switch 223 and the FDD downward signal provided from the first duplexer 225, to an antenna. Also, the triplexer 228 separates an upward signal input through the antenna into an FDD upward signal and a TDD upward signal, and then provides the TDD upward signal to the switch 223 and provides the FDD upward signal to a second duplexer 227. The second duplexer 227 combines the TDD upward signal provided from the switch 223 with the FDD upward signal provided from the triplexer 228, and provides the combined signal to an upward amplifier 225. In this case, the controller 229 controls a switching operation of the switch 223 based on the control signal such that the switch 223 either provides a TDD downward signal received from the first duplexer 225 to the triplexer 228, or provides a TDD upward signal received from the triplexer 228 to the second duplexer 227.

According to the conventional system as shown in FIG. 2, it is possible to prevent a TDD downward signal from exerting an influence upon an upward signal, but it has problems in that it is necessary to generate a separate control signal and to allocate a separate channel to transmit the control signal.

SUMMARY OF THE INVENTION

Accordingly, the present invention has been made to solve the above-mentioned problems occurring in the prior art and provides additional advantages, by providing a radio-over-fiber (ROF) link system for supporting various services, which can prevent a TDD downward signal from exerting an influence upon upward signals by separating the TDD downward signal from an FDD upward signal in a remote access unit (RAU), and can transmit broadcasting signals together with TDD and FDD downward signals.

In accordance with one aspect of the present invention, there is provided a radio-over-fiber (ROF) system for supporting a plurality of services, the system comprising a central access platform (CAP) for providing time division duplexing (TDD), frequency division duplexing (FDD), and broadcasting services, converting a TDD downward signal and FDD/broadcasting downward signals into optical signals, transmitting the converted optical signals to a remote access unit (RAU), converting a TDD upward signal and an FDD upward signal, which have been transmitted as optical signals from the RAU, into electric signals, respectively, and using an optical circulator to separate upward and downward signals from each other; and the RAU for converting the TDD downward signal and FDD/broadcasting downward signals transmitted from the CAP into electric signals, respectively, converting the TDD upward signal and FDD upward signal to be transmitted to the CAP into optical signals, and using an optical circulator in order to separate upward and downward signals from each other, wherein the RAU includes a plurality of signal filtering/separating/combining units, which wirelessly emit the TDD downward signal and FDD/broadcasting downward signals, having been converted into electric signals, through an antenna, and which separate wirelessly-received TDD upward signal and FDD upward signal from each other.

BRIEF DESCRIPTION OF THE DRAWINGS

The above features and advantages of the present invention will be more apparent from the following detailed description taken in conjunction with the accompanying drawings, in which.

DETAILED DESCRIPTION

Hereinafter, embodiments according to the present invention will be described with reference to the accompanying drawings. In the below description, many particular items such as a detailed component device are shown, but these are given only for providing a better understanding of the present invention. Therefore, it will be understood by those skilled in the art that various changes in form and detail may be made and have been contemplated and considered to be within the scope of the present invention.

Figure 1:
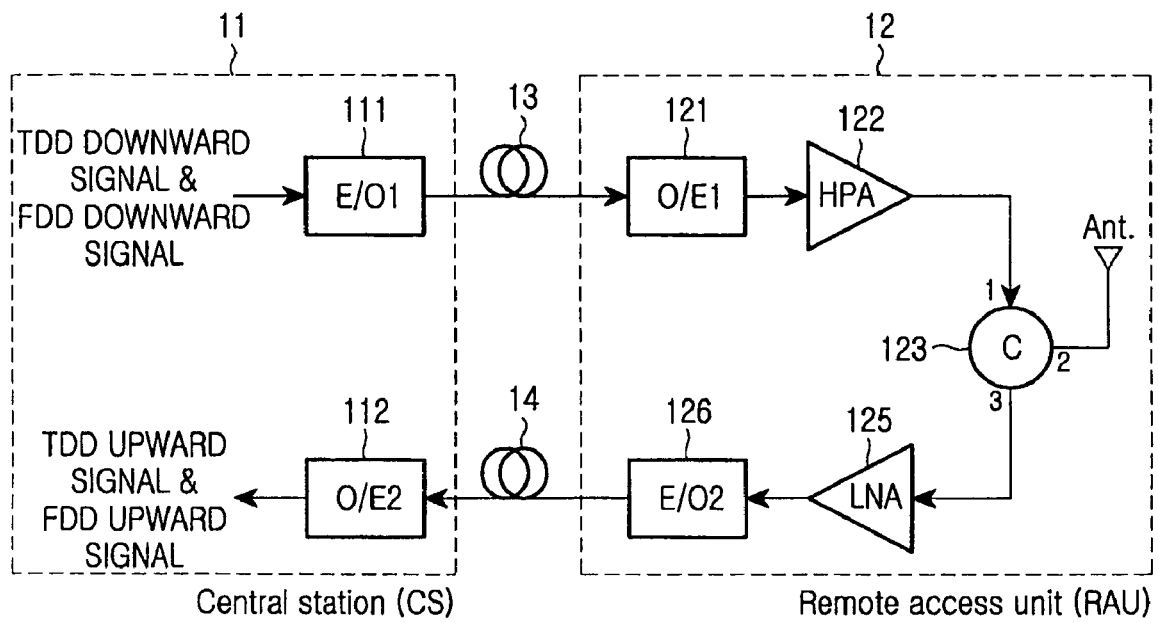
FIG. 1 is a block diagram illustrating the construction of a central station (CS) and a remote access unit (RAU) in a conventional ROF link system for supporting various services.
Figure 2:
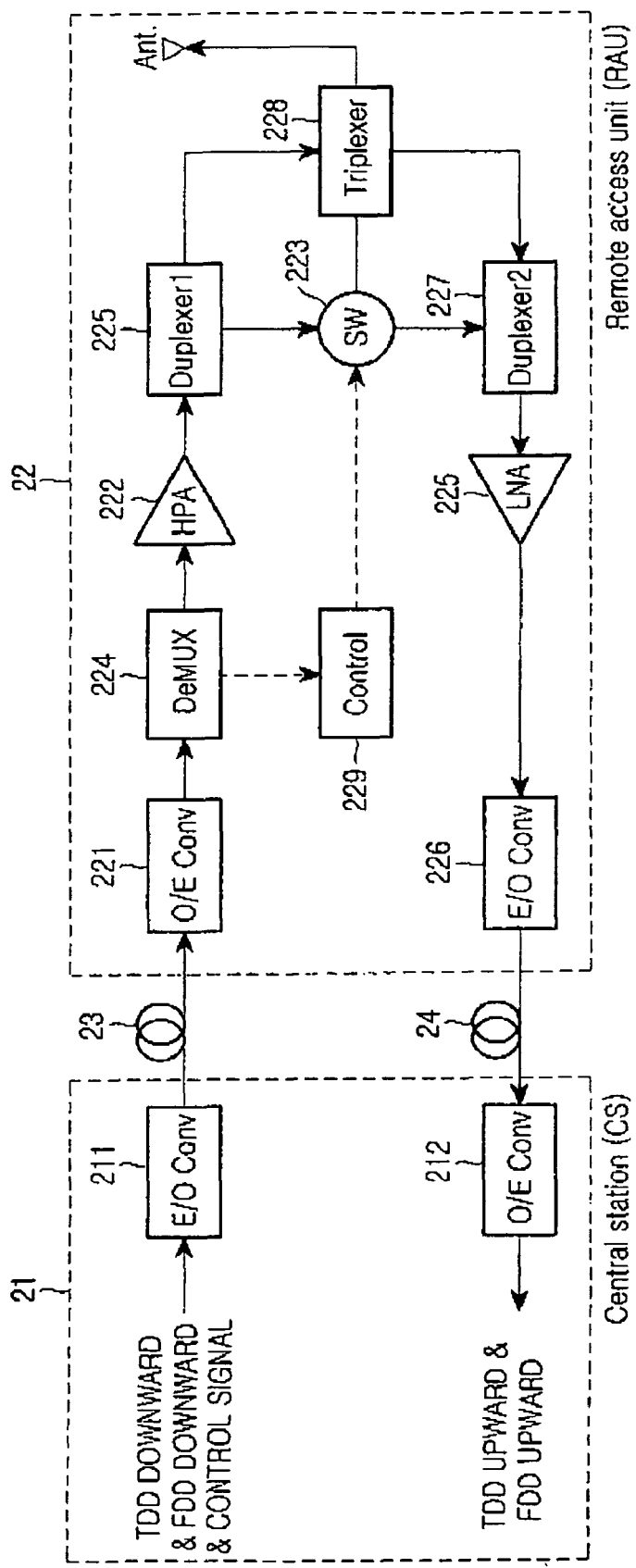
FIG. 2 is a block diagram illustrating the construction of a CS and an RAU in another conventional ROF link system for supporting various services.
Figure 3:
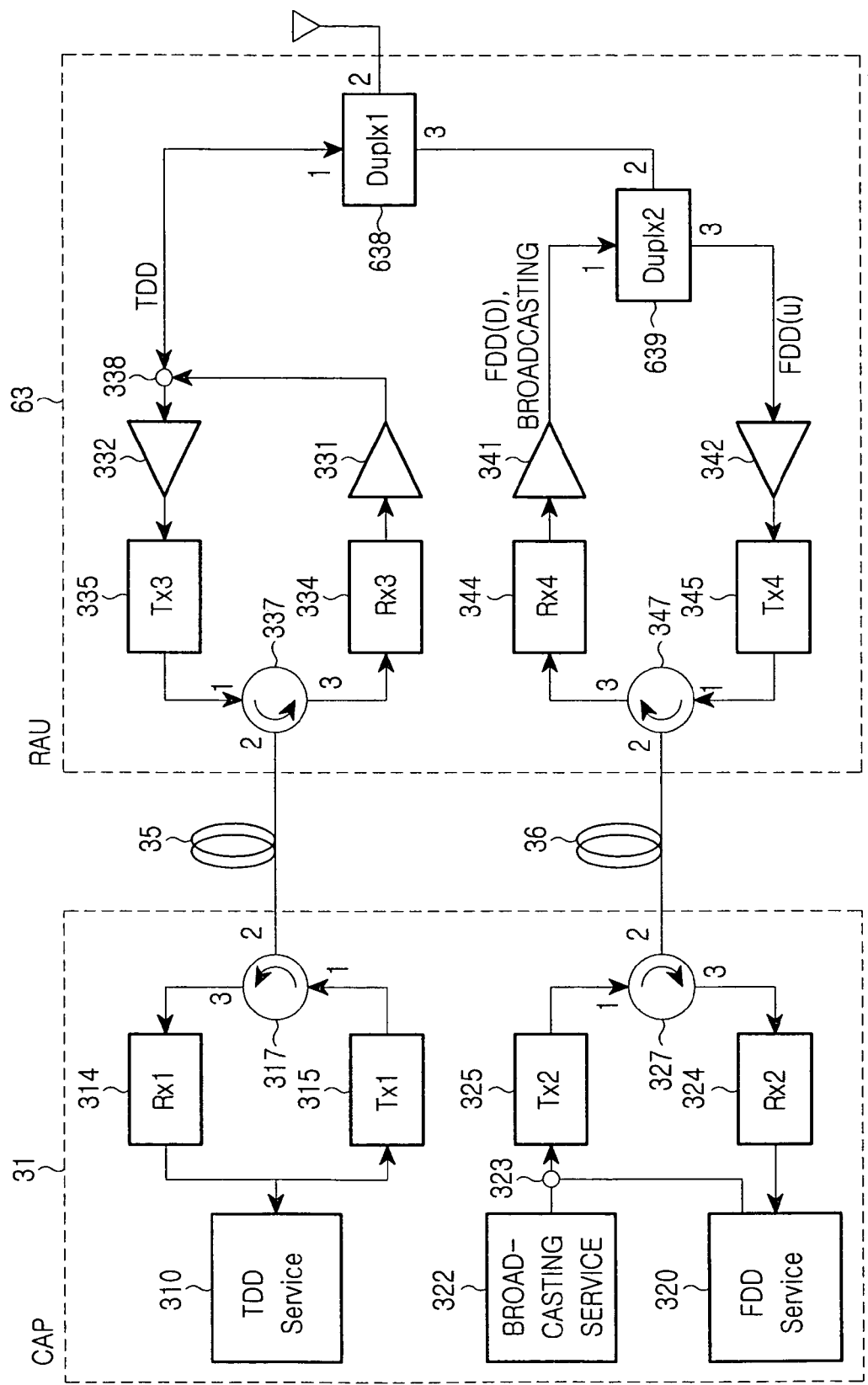
FIG. 3 is a block diagram illustrating the construction of a CAP and an RAU in an ROF link system for supporting various services according to a first embodiment of the present invention.

FIG. 3 is a block diagram illustrating the construction of a central access platform (CAP) and a remote access unit (RAU) in a radio-over-fiber (ROF) link system for supporting a plurality of services according to a first embodiment of the present invention. According to the ROF link system of the first embodiment of the present invention, the CAP 31 includes a time division duplexing (TDD) service unit 310 for processing TDD upward/downward signals in order to provide a TDD-based service, a frequency division duplexing (FDD) service unit 320 for processing FDD upward/downward signals in order to provide an FDD-based service, and a broadcasting service unit 322 for processing upward/downward broadcasting signals in order to provide a broadcasting service. As generally known in the art, TDD upward and downward signals have the same frequency band "fTDD", and FDD upward and downward signals have different frequency bands "fFDD,up" and "fFDD,down". Of course, the frequency bands of the FDD upward and downward signals are distinguished from those of the TDD upward and downward signals. Also, a frequency band "fBroad" for broadcasting signals (which are downward signals) are separately established for a broadcasting service according to embodiments of the present invention.

Each of the TDD service unit 310 and FDD service unit 320 includes separate optical transmission/reception units so as to minimize signal interference with each other. That is, a TDD downward signal output from the TDD service unit 310 is electro-optically converted and output by a first optical transmitter 315, and is transmitted to the RAU 63 via a first optical circulator 317 and a first optical fiber 35. Also, a TDD upward signal, which has been provided through the first optical fiber 35 and first optical circulator 317 from the RAU 63, is photo-electrically converted by a first optical receiver 314. Herein, the first optical circulator 317 receives a TDD downward signal, which has been output from the first optical transmitter 315, through a first port thereof, and outputs the received TDD downward signal through a second port thereof so as to transmit the received TDD downward signal through the first optical fiber 35. Also, the first optical circulator 317 outputs the TDD upward signal, which has been received from the first optical fiber 35 through the second port thereof, through a third port thereof so as to provide the received TDD upward signal to the first optical receiver 314.

An FDD downward signal, which has been output from the FDD service unit 320 of the CAP 31, is combined with a broadcasting signal by a first combiner 323 and is then provided to a second optical transmitter 325. The second optical transmitter 325 electro-optically converts the provided signals and then outputs the converted signals to a second optical circulator 327 so as to transmit the converted signals through a second optical fiber 36 to the RAU 63. An FDD upward signal, which has been provided through the second optical fiber 36 and second optical circulator 327 from the RAU 63, is photo-electrically converted by a second optical receiver 324 and is then output to the FDD service unit 320. Herein, the second optical circulator 327 receives FDD/broadcasting downward signals, which have been output from the second optical transmitter 325, through a first port thereof, and outputs the received FDD/broadcasting downward signals through a second port thereof so as to transmit the received FDD/broadcasting downward signals through the second optical fiber 36. Also, the second optical circulator 327 outputs an FDD upward signal, which has been received from the second optical fiber 36 through the second port thereof, through a third port thereof so as to provide the received FDD upward signal to the second optical receiver 324.

The RAU 63 includes a third optical circulator 337. The third optical circulator 337 receives a TDD downward signal, which has been transmitted through the first optical fiber 35 from the CAP 31, through a second port thereof, and outputs the received TDD downward signal through a third port thereof so as to transmit the received TDD downward signal to a third optical receiver 334. Also, the third optical circulator 337 receives a TDD upward signal, which has been output from a third optical transmitter 335, through a first port thereof, and outputs the received TDD upward signal through the second port thereof so as to transmit the received TDD upward signal through the first optical fiber 35 to the CAP 31. The third optical receiver 334 photo-electrically converts a TDD downward signal, which has been provided from the third optical circulator 337, and outputs the converted signal to a first downward amplifier 331. The first downward amplifier 331 properly amplifies the received signal and outputs the amplified signal so as to transmit the amplified signal through a second combiner 338 to a first port of a first duplexer 638. In this case, the first downward amplifier 331 may include a high-power amplifier (HPA). The first duplexer 638 outputs a TDD downward signal, which has been received through the first port thereof, to an antenna through a second port thereof. Also, the first duplexer 638 outputs a TDD upward signal, which has been received through the antenna, to the second combiner 338 so as to provide the received TDD upward signal to a first upward amplifier 332.

The first upward amplifier 332 properly amplifies the received TDD upward signal and provides the amplified signal to the third optical transmitter 335. The third optical transmitter 335 electro-optically converts the received TDD upward signal and outputs the converted signal to the third optical circulator 337. Herein, the first upward amplifier 332 may include a low-noise amplifier (LNA).

Also, the RAU 63 includes a fourth optical circulator 347. The fourth optical circulator 347 receives FDD/broadcasting downward signals, which have been transmitted through the second optical fiber 36 from the CAP 31, through a second port thereof, and outputs the received FDD/broadcasting downward signals through a third port thereof so as to transmit the FDD/broadcasting downward signals to a fourth optical receiver 344. Also, the fourth optical circulator 347 receives an FDD upward signal, which has been output from a fourth optical transmitter 345, through a first port thereof, and outputs the received FDD upward signal through the second port thereof so as to transmit the received FDD upward signal through the second optical fiber 36 to the CAP 31. The fourth optical receiver 344 photo-electrically converts the FDD/broadcasting downward signals, which have been provided from the fourth optical circulator 347, and outputs the converted signals to a second downward amplifier 341. The second downward amplifier 341 properly amplifies the received signal and outputs the amplified signal to a first port of a second duplexer 639.

The second duplexer 639 outputs the FDD/broadcasting signals, which have been provided from the second downward amplifier 341, through a second port of the second duplexer 639 to a third port of the first duplexer 638. Also, the second duplexer 639 provides an FDD upward signal, which has been received from the first duplexer 638 though the second port of the second duplexer 639, to a second upward amplifier 342 through a third port of the second duplexer 639. The second upward amplifier 342 properly amplifies the received FDD upward signal and provides the amplified signal to the fourth optical transmitter 345. The fourth optical transmitter 345 electro-optically converts the received signal and outputs the converted signal to the fourth optical circulator 347.

The first duplexer 638 outputs FDD/broadcasting downward signals, which have been received through the third port thereof, to the antenna connected with the second port thereof. Also, the first duplexer 638 separates a signal, which has been received through the antenna, into a TDD upward signal and an FDD upward signal, and outputs the TDD and FDD upward signals through the first and third ports thereof, respectively. Herein, the antenna includes a broadband antenna so as to transmit/receive all the signals of an FDD signal band, a TDD signal band, and a broadcasting signal band.

Figure 4A:
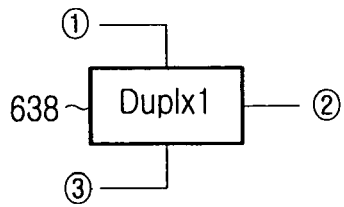
FIGS. 4A and 4B are views including S-parameter characteristic graphs for explaining the operations shown in the first and second duplexers of FIG. 3.
Figure 4A:
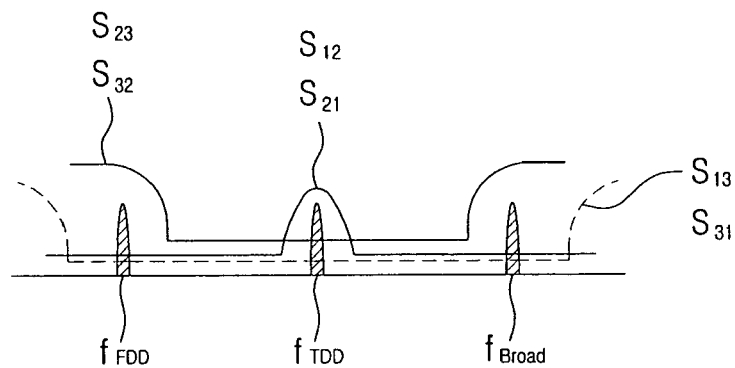
Figure 4B:
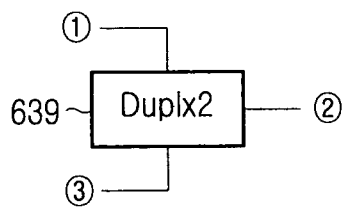
Figure 4B:
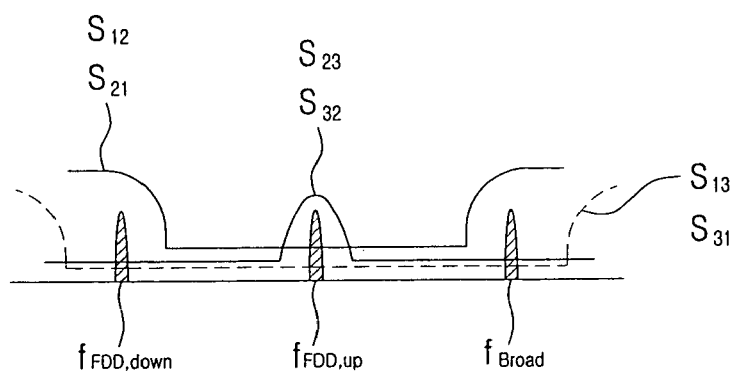

FIGS. 4A and 4B are views including S-parameter characteristic graphs for explaining the operations of the first and second duplexers 638 and 639 of FIG. 3, which are generally referred to as "signal filtering/separating/combining units". First, referring to FIG. 4A, the first duplexer 638 outputs a TDD downward signal input through the first port thereof and FDD/broadcasting downward signals input through the third port thereof, to an antenna through the second port thereof. Also, the first duplexer 638 separates FDD and TDD upward signals, which have been input from the antenna through the second port thereof, from each other, and then outputs the TDD upward signal through the first port thereof and outputs the FDD upward signal through the third port thereof. To this end, as shown in FIG. 4A, the first duplexer 638 is provided with a filtering construction which allows only a signal of the TDD signal band "fFDD" to pass between the first and second ports thereof, and is provided with a filtering construction which allows only signals of the broadcasting signal band "fBroad" and FDD upward/downward signal band "AFDD" to pass between the second and third ports thereof. Also, the first duplexer 638 is provided with a blocking construction which blocks flow of signals of the TDD signal band "fTDD", FDD upward/downward signal band "AFDD" and broadcasting signal band "fBroad" between the first and third ports thereof.

Referring to FIG. 4B, the second duplexer 639 outputs FDD/broadcasting downward signals, which have been input through the first port of the second duplexer 639, to the first duplexer 638 through the second port of the second duplexer 639. Also, the second duplexer 639 outputs an FDD upward signal, which has been received through the second port of the second duplexer 639 from the first duplexer 638, through the third port of the second duplexer 639. To this end, and similar to the filtering shown in FIG. 4A, the second duplexer 639 is provided with a filtering construction which allows only signals of the FDD downward signal band "fFDD,down" and broadcasting signal band "fBroad" to pass between the first and second ports thereof, and is provided with a filtering construction which allows only a signal of the FDD upward signal band "fFDD,up" to pass between the second and third ports thereof. Also, the second duplexer 639 is provided with a blocking construction which blocks flow of all signals of the FDD signal band and broadcasting signal band between the first and third ports thereof.

The operation of the system according to the first embodiment of the present invention will now be described with reference to FIGS. 3, 4A and 4B. First, in the RAU 63 including the RF front-end device, a TDD downward signal transmitted from the CAP 31 is input to the third optical receiver 334 though the third optical circulator 337, is photo-electrically converted, is amplified through the first downward amplifier 331, and is then emitted through the antenna by way of the first duplexer 638. Also, an FDD downward signal and a broadcasting signal are input to the fourth optical receiver 344 through the fourth optical circulator 347, are photo-electrically converted, are amplified through the second downward amplifier 341, and are then emitted through the antenna by way of the second and first duplexers 639 and 638.

A TDD upward signal, which has been received through the antenna, passes through the first duplexer 638 and first upward amplifier 332, is converted into an optical signal by the third optical transmitter 335, and is then output to the first optical fiber 35 through the third optical circulator 337. Also, an FDD upward signal, which has been received through the antenna, passes through the second duplexer 639 and second upward amplifier 342, is converted into an optical signal by the fourth optical transmitter 345, and is then output to the second optical fiber 36 through the fourth optical circulator 347.

Meanwhile, in the CAP 31, a TDD upward signal transmitted from the RAU 63 is input through the first optical circulator 317 to the first optical receiver 314, is photo-electrically converted, and is then provided to the TDD service unit 310. An FDD upward signal is input through the second optical circulator 327 to the second optical receiver 324, is photo-electrically converted, and is then provided to the FDD service unit 320. Also, a TDD downward signal is converted into an optical signal by the first optical transmitter 31 5, and is then transmitted through the first optical circulator 317 to the RAU 63. An FDD downward signal and a broadcasting signal are converted into optical signals by the second optical transmitter 325, and are then transmitted through the second optical circulator 327 to the RAU 63.

The above-mentioned system according to the present invention separates upward and downward signals from each other by using an optical circulator having a high isolation, instead of using an electric circulator, so that it is possible to remove most of the interference phenomenon between upward and downward signals. Also, according to the first embodiment of the present invention, since separate optical transmitters are used to convert TDD and FDD upward signals into optical signals, respectively, it is possible to prevent a TDD downward signal from exerting an influence upon an upward signal. Particularly, since a separate optical transmitter and a separate amplifier are used for an FDD upward signal, it is possible to completely prevent a TDD downward signal from exerting an influence upon the FDD upward signal. Of course, according to characteristics of the TDD service, a TDD upward signal is not influenced by any downward signal because there is no downward signal while the TDD upward signal exists.

Figure 5:
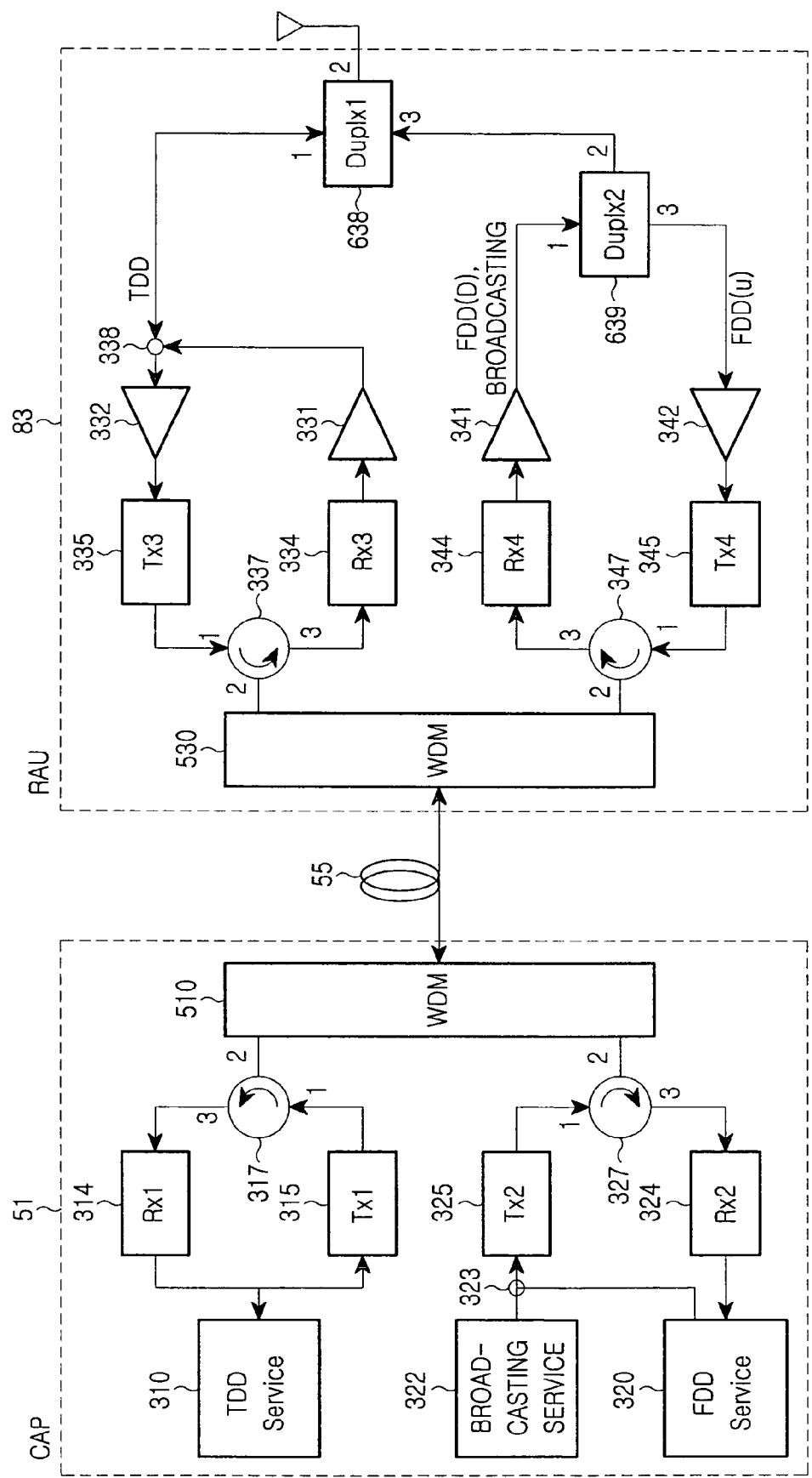
FIG. 5 is a block diagram illustrating the construction of a CAP and an RAU in an ROF link system for supporting a plurality of services according to a second embodiment of the present invention.

FIG. 5 is a block diagram illustrating construction of a CAP and an RAU in an ROF link system for supporting various services according to a second embodiment of the present invention. The ROF link system according to the second embodiment of the present invention has a construction similar to that of the ROF link system of FIG. 3 according to the first embodiment of the present invention. However, differently from the ROF link system of FIG. 3 according to the first embodiment of the present invention which uses two optical fibers (i.e., first and second optical fibers 35 and 36) for transmitting upward and downward optical signals, the ROF link system of FIG. 5 according to the second embodiment of the present invention uses a signal optical fiber for transmitting signals between a CAP 51 and an RAU 83.

That is, the CAP 51 includes a first coarse wavelength division multiplexing filter (CWDM) 510, which multiplexes/demultiplexes optical signals input to or output from the first and second optical circulators 317 and 327. The RAU 83 includes a second CWDM 530, which multiplexes/demultiplexes optical signals input to or output from the third and fourth optical circulators 337 and 347. A single optical fiber, 55 is installed between the first and second CWDMs 510 and 530 so as to transmit optical signals between the first and second CWDMs 510 and 530.

A TDD downward signal output from the first optical circulator 317 and FDD/broadcasting downward signals output from the second optical circulator 327 in the CAP 51 are multiplexed by the first CWDM 510, and are then transmitted through the optical fiber 55 to the second CWDM 530. The second CWDM 530 demultiplexes the received signals, and then provides the demultiplexed signals to the third and fourth optical circulators 337 and 347. Also, TDD and FDD upward signals, which have been output from the third and fourth optical circulators 337 and 347, are wavelength-multiplexed by the second CWDM 530, and are then transmitted through the optical fiber 55 to the first CWDM 510. The first CWDM 510 demultiplexed the received signals, and then provides the demultiplexed signals to the first and second optical circulators 317 and 327.

Figure 6:
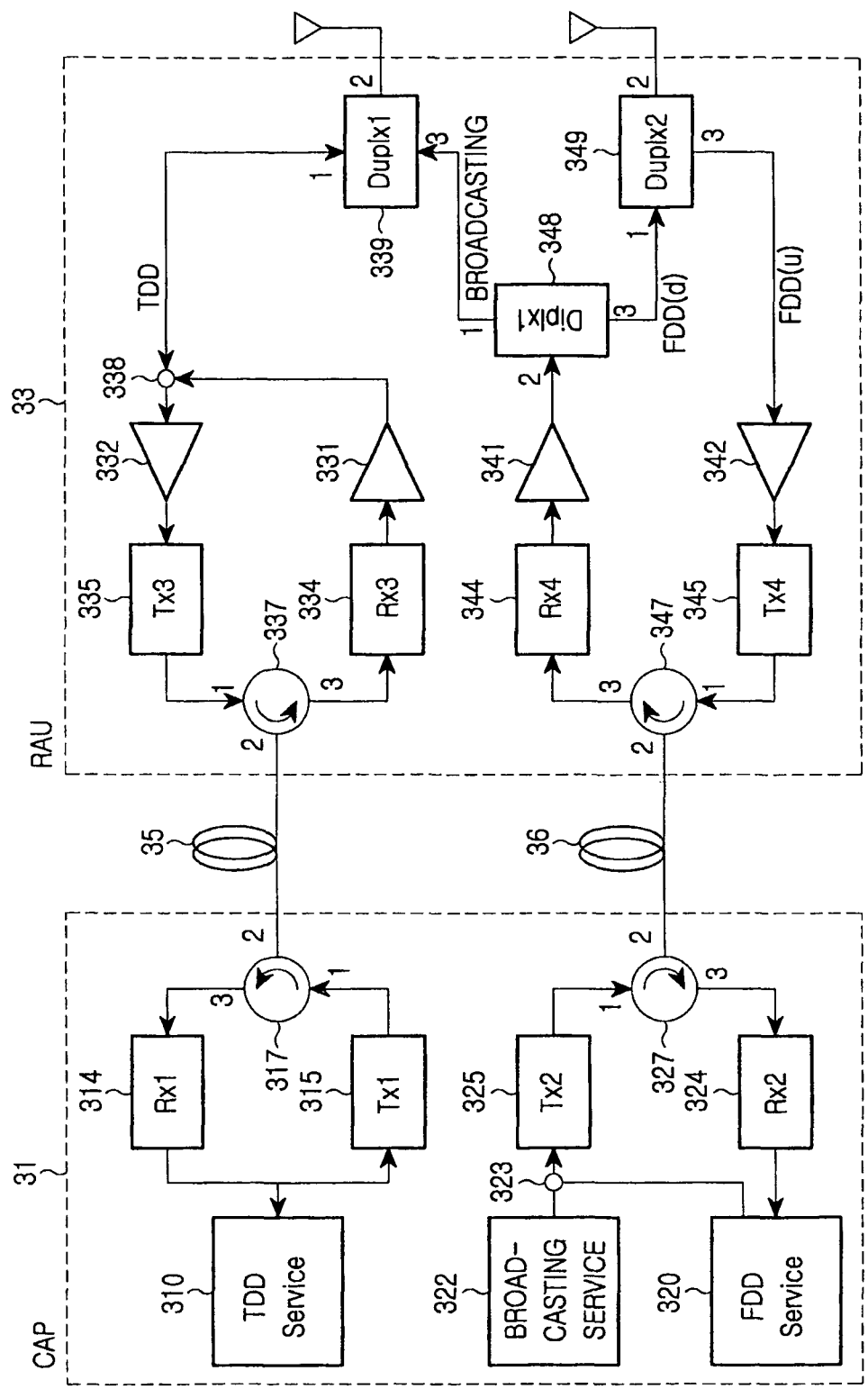
FIG. 6 is a block diagram illustrating the construction of a CAP and an RAU in an ROF link system for supporting a plurality of services according to a third embodiment of the present invention.

FIG. 6 is a block diagram illustrating construction of a CAP and an RAU in an ROF link system for supporting a plurality of services according to a third embodiment of the present invention. The ROF link system according to the third embodiment of the present invention has a construction similar to that of the first embodiment of ROF link system shown in FIG. 3. A point of difference between the ROF link system of FIG. 6 and the ROF link system of FIG. 3 is that the ROF link system according to the third embodiment includes two narrow-band antennas, whereas the ROF link system according to the first embodiment includes a single broadband antenna.

That is, the RAU 33 includes a third optical circulator 337. The third optical circulator 337 transmits a TDD downward signal, which has been received through the first optical fiber 35 from the CAP 31, to the third optical receiver 334. Also, the third optical circulator 337 transmits a TDD upward signal, which has been received from the third optical transmitter 335, through the first optical fiber 35 to the CAP 31. The third optical receiver 334 photo-electrically converts a TDD downward signal, which has been provided from the third optical circulator 337, and outputs the converted signal to the first downward amplifier 331. The first downward amplifier 331 properly amplifies the received signal and outputs the amplified signal so as to transmit the amplified signal through the second combiner 338 to a first port of a first duplexer 339. The first duplexer 339 outputs such a TDD downward signal, which has been received through the first port thereof, to a first antenna. Also, the first duplexer 339 outputs a TDD upward signal, which has been received through the first antenna, to the second combiner 338 so as to provide the received TDD upward signal to the first upward amplifier 332. The first upward amplifier 332 properly amplifies the received TDD upward signal and provides the amplified signal to the third optical transmitter 335. The third optical transmitter 335 electro-optically converts the received TDD upward signal and outputs the converted signal to the third optical circulator 337.

Also, the RAU 63 includes a fourth optical circulator 347. The fourth optical circulator 347 transmits FDD/broadcasting downward signals, which have been received through the second optical fiber 36 from the CAP 31, to the fourth optical receiver 344. Also, the fourth optical circulator 347 transmits an FDD upward signal, which has been received from the fourth optical transmitter 345, through the second optical fiber 36 to the CAP 31. The fourth optical receiver 344 photo-electrically converts FDD/broadcasting signals, which have been provided from the fourth optical circulator 347, and outputs the converted signals to the second downward amplifier 341. The second downward amplifier 341 amplifies the received signals and outputs the amplified signals to a second port of a diplexer 348. The diplexer 348 separates the FDD/broadcasting downward signals, which have been provided from the second downward amplifier 341, into the FDD downward signal and the broadcasting signal. Then, the diplexer 348 outputs the separated FDD downward signal to a first port of a second duplexer 349, and outputs the separated broadcasting signal to a third port of the first duplexer 338. The first duplexer 338 enables such a broadcasting signal to be emitted though a first antenna. The second duplexer 349 enables the FDD downward signal, which has been provided from the diplexer 348, to be emitted through a second antenna. Also, the second duplexer 349 provides an FDD upward signal, which has been received through the second antenna, to the second upward amplifier 342. The second upward amplifier 342 amplifies such an FDD upward signal, and then provides the amplified signal to the fourth optical transmitter 345. The fourth optical transmitter 345 electro-optically converts the received signal, and then provides the converted signal to the fourth optical circulator 347. The TDD signals are processed as described with regard to FIG. 3 and need not be again described in detail with regard to the embodiment of the invention shown in FIG. 6.

Figure 7A:
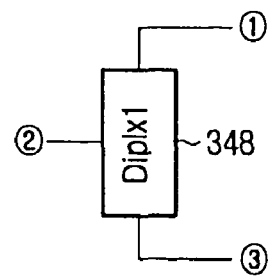
FIGS. 7A, 7B, and 7C views including S-parameter characteristic graphs for explaining the operations of the diplexer and first and second duplexers of FIG. 6.
Figure 7A:
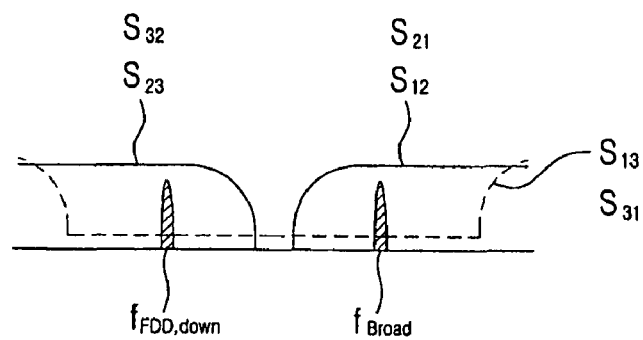
Figure 7B:
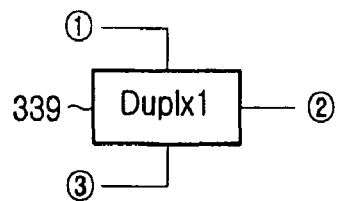
Figure 7B:
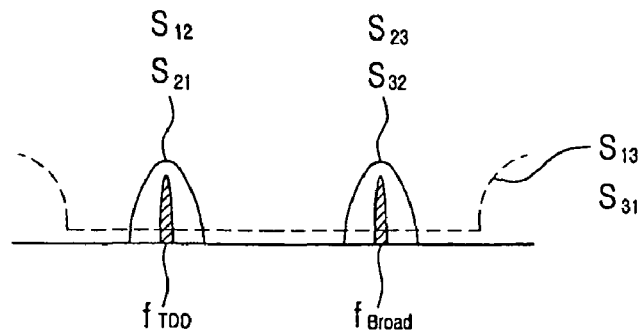
Figure 7C:
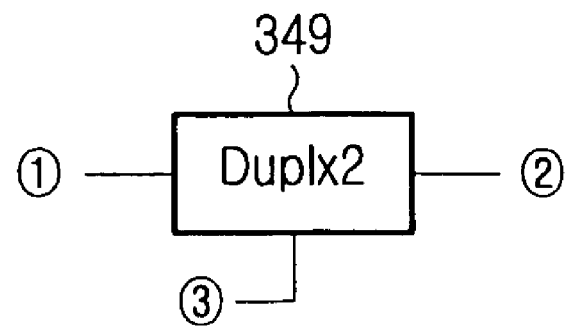
Figure 7C:
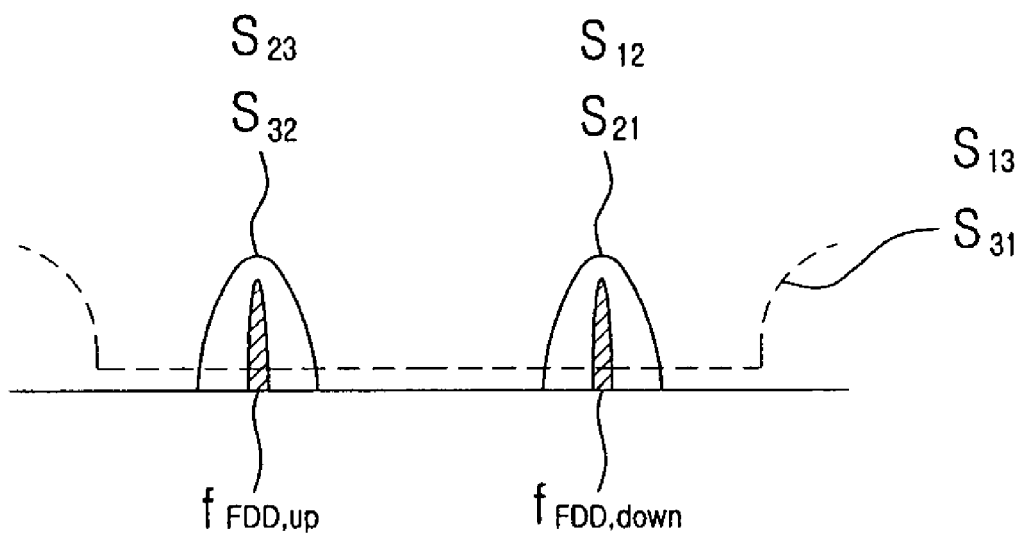

FIGS. 7A, 7B, and 7C views including S-parameter characteristic graphs for explaining the operations of the diplexer 348 and first and second duplexers 338 and 349 of FIG. 6, which are generally referred to as "signal filtering/separating/combining units". First, referring to FIG. 7A, the diplexer 348 separates FDD/broadcasting downward signals, which have been received through the second port thereof, into the FDD downward signal and the broadcasting signal. Then, the diplexer 348 outputs the separated FDD downward signal through a third port thereof, and outputs the separated broadcasting signal through a first port thereof. To this end, as shown in FIG. 7A, the diplexer 348 is provided with a high-band filtering construction which allows a signal of a broadcasting signal band "fBroad" to pass between the first and second ports thereof, and is provided with a low-band filtering construction which allows a signal of an FDD downward signal band "fFDD,down" to pass between the second and third ports thereof, in which the two filtering bands are separated from each other. Also, the diplexer 348 is provided with a blocking construction which blocks flow of signals of the broadcasting signal band "fBroad" and FDD downward signal band "fFDD,down" to pass between the first and third ports thereof.

Referring to FIG. 7B, the first duplexer 338 either outputs a TDD downward signal, which has been received through a first port thereof, to an antenna through a second port thereof, or outputs a TDD upward signal, which has been received from the antenna through the second port thereof, to the first port thereof. Also, the first duplexer 338 outputs a broadcasting signal, which has been received from the diplexer 348 through the third port of the first duplexer 339, to the antenna through the second port of the first duplexer 338. To this end, as shown in FIG. 7B, the first duplexer 338 is provided with a filtering construction which allows a signal of a TDD upward/downward signal band "fTDD" to pass between the first and second ports thereof, and is provided therebetween with a filtering construction which allows a signal of the broadcasting signal band "fBroad" to pass between the second and third ports thereof. Also, the first duplexer 338 is provided with a blocking construction which blocks flow of signals of the TDD upward/downward signal band "fTDD" and broadcasting signal band "fBroad" between the first and third ports thereof.

Referring to FIG. 7C, the second duplexer 349 either outputs an FDD downward signal, which has been received through the first port thereof, to an antenna through a second port thereof, or outputs an FDD upward signal, which has been received through the second port thereof from the antenna, through a third port thereof. To this end, as shown in FIG. 7C, the second duplexer 349 is provided with a filtering construction which allows a signal of an FDD downward signal band "fFDD,down" to pass between the first and second ports thereof, and is provided with a filtering construction which allows a signal of an FDD upward signal band "fFDD,up" to pass between the second and third ports thereof. Also, the second duplexer 349 is provided with a blocking construction which blocks flow of all signals of an FDD signal band "AFDD" between the first and third ports thereof.

The operation of the RAU 33 in the system according to the third embodiment of the present invention will now be described with reference to FIGS. 6, 7A and 7C. A TIDD downward signal transmitted from the CAP 31 is input to the third optical receiver 334 through the third optical circulator 337, is photo-electrically converted, is amplified through the first downward amplifier 331, and is then emitted through the first antenna by way of the first duplexer 3389. Also, the FDD downward signal and broadcasting signal are input to the fourth optical receiver 344 through the fourth optical circulator 347, are photo-electrically converted, are amplified through the second downward amplifier 341, and are then separated into the FDD downward signal and broadcasting signal by the diplexer 348. Then, the FDD downward signal are emitted through the second antenna by way of the second duplexer 349 and the and broadcasting signal emitted through the first antenna by way of first duplexer 338.

A TDD upward signal, which has been received through the first antenna, passes through the first duplexer 338 and first upward amplifier 332, is converted into an optical signal by the third optical transmitter 335, and is then output to the first optical fiber 35 through the third optical circulator 337. Also, an FDD upward signal, which has been received through the second antenna, passes through the second duplexer 349 and second upward amplifier 342, is converted into an optical signal by the fourth optical transmitter 345, and is then output to the second optical fiber 36 through the fourth optical circulator 347.

Figure 8:
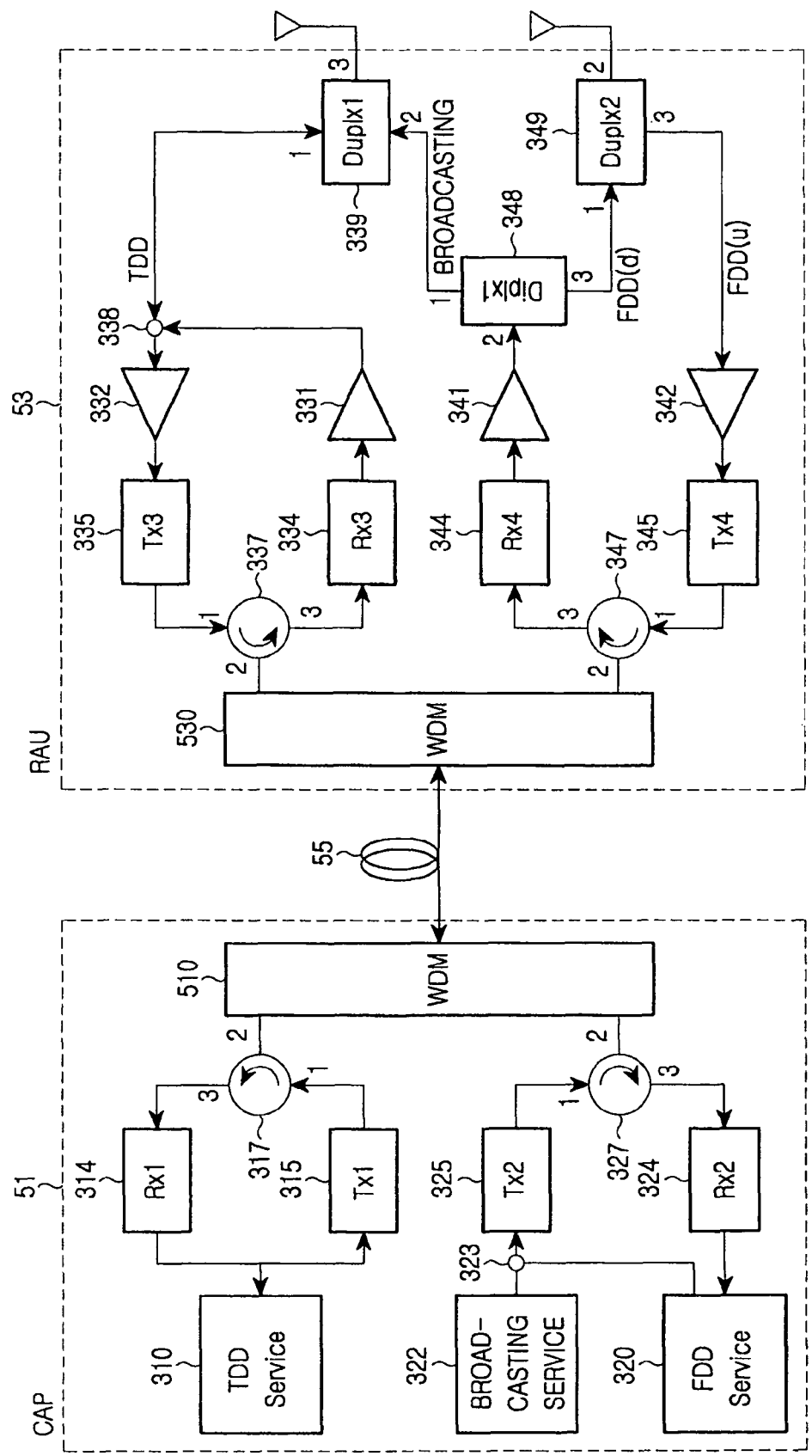
FIG. 8 is a block diagram illustrating the construction of a CAP and an RAU in an ROF link system for supporting a plurality of services according to a fourth embodiment of the present invention.

FIG. 8 is a block diagram illustrating construction of a CAP and an RAU in an ROF link system for supporting a plurality of services according to a fourth embodiment of the present invention. The ROF link system according to the fourth embodiment of the present invention has a construction similar to that of the ROF link system of FIG. 6 according to the third embodiment of the present invention. However, differently from the ROF link system of FIG. 6 according to the third embodiment of the present invention, the ROF link system of FIG. 8 according to the fourth embodiment of the present invention has a construction for enabling all signals to be transmitted through a single optical fiber between the CAP 51 and the RAU 53, which is similar to the construction of the ROF link system of FIG. 5 according to the second embodiment of the present invention.

That is, the CAP 51 includes a first CWDM 510, which multiplexes/demultiplexes optical signals input to or output from first and second optical circulators 317 and 327. The RAU 53 includes a second CWDM 530, which multiplexes/demultiplexes optical signals input to or output from third and fourth optical circulators 337 and 347. A single optical fiber, 55 is connected between the first and second CWDMs 510 and 530 so as to transmit optical signals between the first and second CWDMs 510 and 530.

According to such a construction, a TDD downward signal and FDD/broadcasting downward signals in the CAP 51 are wavelength-multiplexed by the first CWDM 510, and are then transmitted to the second CWDM 530. Then, the second CWDM 530 demultiplexes the multiplexed signal. Also, TDD and FDD upward signals, which have been output from the third and fourth optical circulators 337 and 347 in the RAU 53, are wavelength-multiplexed by the second CWDM 530, and are then transmitted to the first CWDM 510. Then, the first CWDM 510 demultiplexes the multiplexed signal. As the processing shown in FIG. 8, after de-multiplexing the received signals in CAP 51 and RU 53 are similar to that described with regard to FIG. 6, a detailed description of such processing need not be repeated for one skilled in the art to understand the principles of this fourth embodiment of the invention.

As described above, the ROF link system for supporting various services according to the present invention prevents the electric-optical converter and/or an amplifier from operating in a saturation region so as to minimize a downlink signal flowing into an uplink path, thereby improving the performance of the uplink. Also, the ROF link system according to the present invention can transmit a broadcasting signal together with TDD/FDD signals, thereby expanding its application field. In addition, the ROF link system according to the present invention uses an optical circulator having a very high isolation characteristic, so that it is possible to greatly increase the isolation between uplink and downlink. Accordingly, it is possible to prevent the non-linear phenomenon of active elements due to a linkage of a downward signal, thereby preventing the uplink performance from being deteriorated.

While the present invention has been shown and described with reference to certain preferred embodiments of the ROF link system for supporting various services, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A radio-over-fiber (ROF) system for supporting a plurality of services, the system comprising:
   a central access platform (CAP) and a remote access unit (RAU);
   the central access platform for:
   providing time division duplexing (TDD) service, frequency division duplexing (FDD) service, and broadcasting services, converting a TDD downward signal and FDD/broadcasting downward signals into optical signals;

transmitting the converted optical signals to the remote access unit, receiving optical signals from the RAU;

converting a TDD upward signal and an FDD upward signal in the receiving optical signals, into electric signals; and separating the upward and downward signals from each other using an optical circulator; and the remote access unit for:

converting the TDD downward signal and FDD/broadcasting downward signals transmitted from the CAP into electric signals, converting the TDD upward signal and FDD upward signal to be transmitted to the CAP into optical. signals and separating upward and downward signals from each other using an optical circulator means, wherein the RAU includes a plurality of signal filtering/separating/combining units, which wirelessly emit the converted TDD downward signal and FDD/broadcasting downward electric signals through an antenna, and which separate wirelessly-received TDD upward signal and FDD upward signal from each other:

wherein the FDD/broadcasting downward signals have separately established frequency bands, and wherein the optical circulator means includes a first circulator that is separately coupled to inward and downward signals of the TDD service and a second circulator coupled to both the FDD service and the broadcasting service.

2. The system as claimed in claim 1, wherein a first optical fiber for transmitting the TDD upward signal and TDD downward signal and a second optical fiber for transmitting the FDD/broadcasting downward signals and FDD upward signal are separately constructed between the CAP and the RAU.

3. A radio-over-fiber (ROF) system for supporting a plurality of services, the system comprising:

a central access platform (CAP) and a remote access unit (RAU);

the central access platform for:

providing time division duplexing (TDD), frequency division duplexing (FDD), and broadcasting services, converting a TDD downward signal and FDD/broadcasting downward signals into optical signals;

transmitting the converted optical signals to the remote access unit, receiving optical signals from the RAU;

converting a TDD upward signal and an FDD upward signal in the receiving optical signals, into electric signals; and separating the upward and downward signals from each other using an optical circulator; and the remote access unit for:

converting the TDD downward signal and FDD/ broadcasting downward signals transmitted from the CAP into electric signals, converting the TDD upward signal and FDD upward signal to be transmitted to the CAP into optical signals and separating upward and downward signals from each other using an optical circulator, wherein the RAU includes a plurality of signal filtering/separating/combining units, which wirelessly emit the converted TDD downward signal and FDD/broadcasting downward electric signals through an antenna, and which separate wirelessly-received TDD upward signal and FDD upward signal from each other, wherein the CAP comprises:

first and second optical transmitters for electro-optically converting the TDD downward signal and FDD/broadcasting downward signals, respective;

a first optical circulator for receiving the electro-optically-converted TDD downward signal through a first port of the first optical circulator, outputting the received TDD downward signal through a second port of the first optical circulator so as to transmit the received TDD downward signal to the RAU, and outputting a TDD upward signal, which has been received from the RAU, through a third port of the first optical circulator;

a second optical circulator for receiving the electro-optically-converted FDD/broadcasting downward signals through a first port of the second optical circulator, outputting the received FDD/broadcasting downward signals through a second port of the second optical circulator so as to transmit the received FDD/broadcasting downward signals to the RAU, and outputting an FDD upward signal, which has been received from the RAU, through a third port of the second optical circulator; and first and second optical receivers for photo-electrically converting the TDD upward signal and FDD upward signal which, have been transmitted from the first and second optical circulators, respectively.

4. A radio-over-fiber (ROF) system for supporting a plurality of services, the system comprising:

a central access platform (CAP) and a remote access unit (RAU);

the central access platform for:

providing time division duplexing (TDD), frequency division duplexing (FDD), and broadcasting services, converting a TDD downward signal and FDD/broadcasting downward signals into optical signals;

transmitting the convened optical signals to the remote access unit, receiving optical signals the RAU;

converting a TDD upward signal and an FDD upward signal in the receiving optical signals, into electric signals; and separating the upward and downward signals from each other using an optical circulator; and the remote access unit for:

converting the TDD downward signal and FDD/ broadcasting downward signals transmitted from the CAP into electric signals, converting the TDD upward signal and FDD upward signal to be transmitted to the CAP into optical, signals and separating upward and downward signals from each other using an optical circulator, wherein the RAU includes a plurality of signal filtering/separating/combining units, which wirelessly emit the converted TDD downward signal and FDD/broadcasting downward electric signals through an antenna, and which separate wirelessly-received TDD upward signal and FDD upward signal from each other, wherein the RAU comprises:

a third optical circulator for receiving a TDD downward signal from the CAP through a second port of the third optical circulator and outputting the TDD downward signal through a third port of the third optical circulator, and receiving a TDD upward signal, which is to be transmitted to the CAP, through a first port of the third optical circulator and outputting the TDD upward signal through the second port of the third optical circulator;

a third optical receiver for photo-electrically converting the TDD downward signal output from the third optical circulator;

a first downward amplifier for amplifying the TDD downward signal output from the third optical receiver;

a first duplexer for receiving the TDD downward signal from the first downward amplifier through a first port of the first duplexer and emitting the TDD downward signal through an antenna connected with a second port of the first duplexer, outputting a TDD upward signal, which has been received from the antenna, through the first port of the first duplexer, outputting FDD/broadcasting downward signals, which have been received through a third port of the first duplexer, to the antenna through the second port of the first duplexer, and outputting an FDD upward signal, which has been received from the antenna, through the third port of the first duplexer;

a first upward amplifier for amplifying the TDD upward signal output from the first duplexer;

a third optical transmitter for outputting the TDD upward signal, which has been received from the first upward amplifier, to the third optical circulator;

a fourth optical circulator for receiving FDD/broadcasting downward signals from the CAP through a second port of the fourth optical circulator and outputting the FDD/broadcasting downward signals through a third port of the fourth optical circulator, and receiving an FDD upward signal, which is to be transmitted to the CAP, through a first port of the fourth optical circulator and outputting the FDD upward signal through the second port of the fourth optical circulator;

a fourth optical receiver for photo-electrically converting the FDD downward signal output from the fourth optical circulator;

a second downward amplifier for amplifying FDD/broadcasting downward signals output from the fourth optical receiver;

a second duplexer for receiving the FDD/broadcasting downward signals from the second downward amplifier through a first port of the second duplexer and outputting the FDD/broadcasting downward signals to the first duplexer through a third port of the second duplexer, and outputting the FDD upward signal, which has been received from the first duplexer, through the third port of the second duplexer;

a second upward amplifier for amplifying the FDD upward signal output from the second duplexer; and a fourth optical transmitter for outputting the FDD upward signal, which has been output from the second upward amplifier, to the fourth optical circulator.

5. The system as claimed in claim 4, wherein transmission of the TDD upward signal and TDD downward signal between the first optical circulator of the CAP and the second optical circulator of the RAU is achieved through a first optical fiber, and transmission of the FDD/broadcasting downward signals and FDD upward signal between the first optical circulator of the CAP and the second optical circulator of the RAU is achieved through a second optical fiber.

6. The system as claimed in claim 4, wherein
the CAP further comprises:
a first wavelength division multiplexer for multiplexing/demultiplexing signals input to/output from the first and second optical circulators, and
the RAU further comprises:
a second wavelength division multiplexer for multiplexing/demultiplexing signals input to/output from the third and fourth optical circulators, and the first and second wavelength division multiplexers transmit optical signals through a single optical fiber to each other.

7. A radio-over-fiber (ROF) system for supporting a plurality of services, the system comprising:
a central access platform (CAP) and a remote access unit (RAU);
the central access platform for:
providing time division duplexing (TDD), frequency division duplexing (FDD), and broadcasting services, converting a TDD downward signal and FDD/broadcasting downward signals into optical signals;
transmitting the converted optical signals to the remote access unit, receiving optical signals from the RAU:
converting a TDD upward signal and an FDD upward signal in the receiving optical signals, into electric signals; and
separating the upward and downward signals from each other using an optical circulator; and
the remote access unit for:
converting the TDD downward signal and FDD/broadcasting downward signals transmitted from the CAP into electric signals,
converting the TDD upward signal and FDD upward signal to be transmitted to the CAP into optical signals and separating upward and downward signals from each other using an optical circulator,
wherein the RAU includes a plurality of signal filtering/separating/combining units, which wirelessly emit the converted TDD downward signal and FDD/broadcasting downward electric signals through an antenna, and which separate wirelessly-received TDD upward signal and FDD upward signal from each other, wherein the RAU comprises:
a third optical circulator for receiving a TDD downward signal from the CAP through a second port of the third optical circulator and outputting the TDD downward signal through a third port of the third optical circulator, and receiving a TDD upward signal, which is to be transmitted to the CAP, through a first port of the third optical circulator and outputting the TDD upward signal through the second port of the third optical circulator;
a third optical receiver for photo-electrically converting the TDD downward signal output from the third optical circulator;
a first downward amplifier for amplifying the TDD downward signal output from the third optical receiver;
a first duplexer for receiving the TDD downward signal from the first downward amplifier through a first port of the first duplexer and emitting the TDD downward signal through a first antenna connected with a second port of the first duplexer, outputting a TDD upward signal, which has been received from the first antenna, through the first port of the first duplexer, and outputting a broadcasting signal, which has been received through a third port of the first duplexer, to the first antenna through the second port of the first duplexer;
a first upward amplifier for amplifying the TDD upward signal output from the first duplexer;
a third optical transmitter for outputting the TDD upward signal, which has been received from the first upward amplifier to the third optical circulator;
a fourth optical circulator for receiving FDD/broadcasting downward signals from the CAP through a second port of the fourth optical circulator and outputting the FDD/broadcasting downward signals through. a third port of the fourth optical circulator, and receiving an FDD upward signal, which is to be transmitted to the CAP, through. a first port of the fourth optical circulator and outputting the FDD upward signal through the second port of the fourth optical circulator;

a fourth optical receiver for photo-electrically converting the FDD downward signal output from the fourth optical circulator;

a second downward amplifier for amplifying FDD/broadcasting downward signals output from the fourth optical receiver;

a second diplexer for separating the FDD/broadcasting downward signals, which have been amplified by the second downward amplifier, into the FDD downward signal and the broadcasting signal, outputting the separated FDD downward signal to a first port of a third duplexer, and outputting the separated broadcasting signal to the third port of the first duplexer;

the third duplexer for outputting an FDD downward signal, which has been input through a third port of the third duplexer, to a second antenna through a second port of the second duplexer, and outputting an FDD upward signal, which has been received through the second port of the third duplexer from the second antenna, through the third port of the third duplexer;

a second upward amplifier for amplifying the FDD upward signal output from the third duplexer; and a fourth optical transmitter for outputting the FDD upward signal, which has been output from the second upward amplifier, to the fourth optical circulator.

8. The system as claimed in claim 7, wherein transmission of the TDD upward signal and TDD downward signal between the first optical circulator of the CAP and the second optical circulator of the RAU is achieved through a first optical fiber, and transmission of the FDD/broadcasting downward signals and FDD upward signal between the first optical circulator of the CAP and the second optical circulator of the RAU is achieved through a second optical fiber.

9. The system as claimed in claim 7, wherein
the CAP further comprises:
a first wavelength division multiplexer for multiplexing/demultiplexing signals input to/output from the first and second optical circulators' and
the RAU further comprises:
a second wavelength division multiplexer for multiplexing/demultiplexing signals input to/output from the third and fourth optical circulators, and the first and second wavelength division multiplexers transmit optical signals through a single optical fiber to each other.

\* \* \* \* \*